United States Patent
Schaeffer et al.

(10) Patent No.: US 12,535,610 B2
(45) Date of Patent: Jan. 27, 2026

(54) OPERATING A SEISMIC SENSING SYSTEM

(71) Applicant: Halliburton Energy Services, Inc., Houston, TX (US)

(72) Inventors: Benjamin Schaeffer, Centennial, CO (US); Mikko K. Jaaskelainen, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 380 days.

(21) Appl. No.: 18/197,450

(22) Filed: May 15, 2023

(65) Prior Publication Data
US 2024/0385343 A1 Nov. 21, 2024

(51) Int. Cl.
G01V 1/50 (2006.01)
G01V 1/28 (2006.01)
G01V 1/30 (2006.01)

(52) U.S. Cl.
CPC ............... G01V 1/50 (2013.01); G01V 1/288 (2013.01); G01V 1/301 (2013.01); G01V 2210/646 (2013.01)

(58) Field of Classification Search
CPC .......... G01V 1/50; G01V 1/288; G01V 1/301; G01V 2210/646
See application file for complete search history.

(56) References Cited

U.S. PATENT DOCUMENTS

| | | | | |
|---|---|---|---|---|
| 6,856,575 | B2* | 2/2005 | Jones | G01V 1/01 367/43 |
| 7,830,745 | B2* | 11/2010 | Suarez | G01V 1/42 166/250.1 |
| 10,180,515 | B2* | 1/2019 | Ellmauthaler | E21B 47/135 |
| 2012/0051178 | A1 | 3/2012 | Zhang et al. | |
| 2013/0158878 | A1 | 6/2013 | Rebel et al. | |
| 2016/0320504 | A1 | 11/2016 | Lindgaard et al. | |
| 2020/0116882 | A1 | 4/2020 | Zheng et al. | |

OTHER PUBLICATIONS

Mohine et al., "Single Acoustic Sensor-Based Time-Frequency Spectrum Sensing Approach for Land Vehicle Detection", Jul. 1, 2020, IEEE Publication, vol. 20, No. 13, pp. 7275-7282 (Year: 2020).*

(Continued)

Primary Examiner — Elias Desta
(74) Attorney, Agent, or Firm — NOVAK DRUCE CARROLL LLP (57) ABSTRACT

Systems and methods for operating a distributed acoustic sensing (DAS) system are disclosed that process the DAS signal by downsampling the received signal and stacking the channels, generating a plurality of sliding windows of the processed signal, analyzing the windows to either identify a microseismic event or determine that the window contains only noise, then discarding all noise windows. A convolutional neural network is used to determine an onset time and a peak channel of each microseismic event and to reduce the dimensionality of the data in time and space around the onset time. A convolutional neural network is used to identify a first arrival pick within the truncated window of all recorded phases, which are then used to determine the physical location of the source fracture.

20 Claims, 4 Drawing Sheets

(56) References Cited

OTHER PUBLICATIONS

International Search Report & Written Opinion; PCT Application No. PCT/US2023/022398; mailed Feb. 14, 2024.

Abstract of Stork, Anna L. et al., "Application of machine learning to microseismic event detection in distributed acoustic sensing data", Geophysics, Jun. 13, 2020, vol. 85, pp. KS149-KS160; pp. KS149-KS150, KS156, KS158.

MagiQ; "Sub-surface Monitoring with Cost-Effective, Three-Component Optical Sensors & DAS Arrays", Optical Processing Innovation for Defense, Telecom, and Energy Exploration; GeoLite; Apr. 2022.

Binder, Gary et al., "Detecting microseismic events in downhole distributed acoustic sensing data using convolutional neural networks", SEG International Exposition and 89th Annual Meeting; Published online Aug. 1, 2019.

Eaton, David W. et al., "Effectiveness of dip-in DAS observations for low-frequency strain and microseismic analysis: The CanDID experiment", Department of Geoscience; Second International Meeting for Applied Geoscience & Energy;2022.

Wang, Chaoyi et al., "Hydraulic Fracture Monitoring Using Distributed Acoustic Sensing: A Case Study Using Dip-In Fiber", Unconventional Resources Technology Conference; Jun. 2022.

\* cited by examiner

OPERATING A SEISMIC SENSING SYSTEM

TECHNICAL FIELD

The present technology pertains to characterizing the effects of hydraulic fracture stimulations in oil and gas wells by detecting and analyzing microseismic signals originating from local fractures produced by the stimulation.

BACKGROUND

The productivity of low-permeability oil and gas reservoirs has been significantly improved by the adoption of hydraulic fracturing, which opens new cracks in rock formations by injecting pressurized fluid down a wellbore and into the reservoir. These cracks serve as low-resistance flow paths to the wellbore, enabling the entrapped gas and/or oil to pass more easily to the wellbore and thus be extracted. Characterizing the geometry and orientation of hydraulically induced fractures allows identification of potential issues during well completion and provides information useful during production. This characterization can currently be done to a limited degree with acoustic data gathered using an array of geophones placed on the surface surrounding the well site or over the lateral wellbore.

The technological development of distributed acoustic sensing (DAS) monitoring has provided a significant uplift in how oil and gas operators monitor hydraulic fracture stimulations. By deploying a FO cable within an unconventional oil and gas well and connecting it to a DAS laser source and detection system, the FO cable is effectively transformed into a dense array of strain sensors with a spatial resolution of a few meters. DAS systems use various techniques, e.g., detecting Rayleigh scattering, and often are interferometric in nature. Conventional systems use homodyne, heterodyne, Michelson, Mach-Zender, Fabry-Perot, phase-based, intensity-based, coherence-based, and static (absolute) or dynamic (relative) sensing principles. Fiber optic (FO) cable deployment include permanent cable installations, wherein the FO cable is clamped outside tubing and cemented in place, and temporary deployments using wireline/slickline/coiled tubing or disposable fiber, wherein a FO cable is deployed into a monitoring well for the duration of a fracturing operation.

The data collected using a DAS system inherently has a low signal-to-noise ratio (SNR). One conventional method of extracting the signal from the data is to use a convolutional neural network (CNN) design that entails several repetitions of (a) convolution of the data image with a learnable kernel to create a feature map, followed by (b) downsampling of the feature map. The CNN is trained using a large number of training data sets, e.g., samples of pure noise with synthetic microseismic event signals injected into a portion of the data samples. Conventional CNN processing is slow and has difficulty in picking out the first arrival of a seismic signal.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Advances in fiber optic sensing enables a large variety of sensing applications in the Oil & Gas industry. There are several ways to deploy optical fiber sensors ranging from permanent cables deployed behind casing and cemented in place, permanent cables deployed on production tubing, wireline-deployed retrievable cables, slickline-deployed retrievable cables, coiled tubing-deployed retrievable or disposable cables, and disposable fibers that can be gravity deployed and pumped into a wellbore. Some of these retrievable and disposable deployments use tractors and other conveyance vehicles.

The fiber optic cable deployment methods enable different sensing applications and cable deployment method that may impact data interpretation. A permanent cable cemented behind casing will have good coupling to the formation which enable both P and S wave seismic, acoustic, strain, pressure and temperature measurements. Permanent cables may require a large wellbore to accommodate clamps and centralizers to protect the cable during Run-In-Hole (RIH).

Tubing-deployed permanent cables are more protected during deployment and will enable P wave seismic, acoustic, temperature and pressure measurements. Some of the measurements, e.g. temperature, may need modeling to compensate for heat transfer effects between the formation and cable location. Tubing deployed is unlikely to measure formation strain or S wave seismic signals, given the propagation modes.

Retrievable and disposable cable deployments can be used to measure seismic P and S wave signals, strain, acoustic, temperature and pressure in various configurations. Some of these signals have complex transfer functions between the formation through cement and/or tubing, or due to cable construction and coupling effects. Cable construction, gravity, and surface properties of the cable all impact the coupling and friction between the cable and the inside of the casing or tubing where the cable is deployed.

Any of the fiber optic cables may house single-mode, multi-mode, or a combination of single-mode and multi-mode fibers depending on the measurement systems and sensing principles. Some optical fibers are enhanced and may include variations of the optical fiber core to include enhancements to the back scatter profile and/or include Fiber Bragg Grating (FBG) sensors.

The optical fibers may be interrogated using one or more sensing principles, e.g., Rayleigh scattering, Brillouin scattering, Raman scattering to enable Distributed Temperature Sensing (DTS) systems, Distributed Acoustic Sensing (DAS) Systems, and Distributed Strain Sensing (DSS) Systems. Some systems measure wavelength, intensity, phase shift, interference between signals using homodyne or heterodyne principles or use interferometric sensing principles e.g., Fabry-Perot, Michelson, Mach-Zehnder or Sagnac. Certain sensing systems and/or sensor topologies use one or more of Optical Time Domain Reflectometry (OTDR), Optical Frequency Domain Reflectometry (OFDR), Time Division Multiplexing (TDM), Wavelength Division Multiplexing (WDM), or Code Division Multiplexing (CDM).

Fiber optic sensing systems can be divided in three general classes. Fiber optic sensing systems can be (1) a single point sensing system wherein the cable is used for signal transmission and the point sensor is located at the end of the transmission fiber, (2) a multi-point sensing system that multiplexes a number of sensors on a single fiber wherein the sensors may be the same type or different types, or (3) a distributed sensing system wherein the fiber is the sensor. Certain installations combine two or more of these systems using a multiplexing architecture.

Single-point, multi-point, and most distributed sensing systems generate low data volumes, e.g., one kilobyte per second (kB/s) or less. DAS systems, however, can generate data volumes of a GB/s or more of data, which creates a huge challenge in processing the data in a usable timeframe. DAS systems are often used for micro-seismic monitoring, and it is not uncommon for conventional data processing to take 3-6 months after the data is acquired. Conventional DAS-based microseismic sensing is therefore limited to post-processing applications and not suitable for applications that require real-time sensing and control.

A large number of applications in the energy and transportation industry use fiber optic sensing systems, including hydrocarbon production in unconventional wells, offshore dry-tree wells and subsea wells, mature fields in conventional reservoirs, geothermal wells, carbon capture and storage (CCS) wells, infrastructure monitoring on pipelines/roads/bridges/buildings/railroads, various chemical and processing plants. Some of these applications have microseismic type events but current methods cannot support operations where real-time sensing and control is required.

One application where real-time data processing of microseismic data is required to enable a closed-loop control system is hydraulic fracturing. The disclosed technology enables real-time processing of microseismic events and monitoring of fracture evolution in a reservoir overtime during hydraulic fracturing operations. The real-time processing and knowledge of fracture evolution e.g., length, height, width, azimuth, and associated growth rates including changes to growth rates, enable real-time control of fracturing operations. This may include controlling the fracture equipment to manage injection rates, pressures, chemicals, proppant concentration to achieve certain objectives e.g., avoiding well interference where fractures from the treatment well connect with other existing well bores. Real-time microseismic data and other real-time data, e.g., strain-based and pressure-based data streams, may be combined to reduce uncertainty and be used as input for controlling the fracturing operation. The optical sensing fibers may be permanently installed in a treatment well or a monitoring well or deployed using retrievable or disposable technology in a monitoring well.

Retrievable and disposable cable deployments are often very cost-effective means of deploying sensing fibers into monitoring wells during hydraulic fracturing operations. Some of the measured signals have complex transfer functions between the formation through cement and/or tubing, or due to cable construction and coupling effects. Cable construction, gravity and surface properties of the cable all impact the coupling and friction between the cable and the inside of the casing or tubing where the cable is deployed. Large signals, e.g., strain events caused by hydraulic fracturing, may cause the cables or fibers to slip so different cables may show different behavior for the same event. The systems and methods disclosed herein may be used for identifying and classifying signals from different cables using the proposed invention.

Another application that benefits from real-time DAS analysis is CCS, wherein the objective is to inject a desired volume of fluid into selected reservoir layers without damaging the cap-rock layer of the reservoir. It is desirable to provide real-time monitoring of inflow points and inflow volumes in a completion and reservoir using DAS technology, wherein each inflow zone is monitored in order to determine flow into the zone by analyzing DAS data. A Design of Experiment (DoE) operation during startup, wherein Inflow Control Devices (ICDs), e.g., an Inflow Control Valve (ICV), are cycled in a planned manner and combined with various measured data e.g., surface flow rates and surface and subsurface pressures, to generate a varied data set that can be used to build data-driven flow-allocation models using machine learning methods. Injection pressures are often limited to a calculated value to keep the reservoir pressure below a fracture gradient at which caprock failure would occur. The injection pressure can be increased with real-time microseismic monitoring as injection pressures can be reduced if any signs of induced microseismic activity is detected. The sensor data and associated models may then be used to control the $CO_2$ injection pressures and rates, as well as ICV settings.

It is also a regulatory requirement to monitor cap-rock integrity where cap-rock failure may be predicted by real-time measurements e.g., induced microseismic events, surface injection pressure, downhole pressure(s) and strain measurements. Real-time measurements can be used to predict caprock failure and multiple measurements over time will provide higher certainty of the prediction. In certain situations, sensing cables are permanently installed in the injection well and/or monitoring wells, and/or surface 1-axis and/or 3-axis seismic sensors, e.g., geophones or accelerometers, are used for data collection. In certain situations, the surface sensor stations include rotational sensors in addition to the seismic sensors. In certain situations, the surface sensors use wired and/or wireless real-time communication. Other injection and storage facilities, e.g., natural gas storage caverns or hydrogen storage caverns, have many challenges similar to CCS injection and storage.

It is common to inject water or produced fluids into reservoirs for pressure maintenance in order to optimize production, mitigate subsidence, or fluid disposal. Realtime indicators, like induced microseismic event detection, enable improved control of injection pressures, flow rates, and rates of change to avoid formation and caprock damage. The control loop, open or closed, may use microseismic measurements as an input with pressure, rate, and zone ICD settings as control variables.

It is desirable to monitor pipelines and flow lines servicing energy infrastructure to avoid leaks and catastrophic damage. The processing challenges are very similar where ground shift, overpressure, and pipeline damage may generate unique signatures prior to a leak and real-time processing is required.

Enhanced geothermal systems may be intentionally fractured in order to contact a desired rock volume thus enabling thermal energy harvesting. It is desirable to monitor the fracturing operating in real-time similar to the case of unconventional wells. Production operations in geothermal wells require a balance between re-injected fluid and produced fluid to prevent fractures from closing. Closing fractures may generate microseismic events as the rock shifts and slips and it is desirable to provide closed loop control between the injection and production based on real-time data obtained from DAS systems for microseismic events, DSS systems for formation strain and movement monitoring, and DTS systems for temperature monitoring. The sensing cables may be installed in the injection and/or production wells. Fiber optic sensing data like temperature, strain, subsurface pressure and microseismic events may be inputs to control injection and production pressures and rates.

Realtime infrastructure monitoring show many similar real-time processing challenges as bridges and any load-bearing infrastructure may exhibit micro-seismic type signatures as they deteriorate, e.g., cracking of cement and/or rebar movement inside the structure. It is highly desirable to measure strain, acoustic events, and microseismic signatures in real-time on critical infrastructure where the data may be used to predict safe-operating conditions to prevent loss of life. The systems and methods disclosed herein enable real-time event detection where the output may be used for infrastructure health monitoring and alarms.

Maximizing the oil and/or gas production performance of a wellbore is dependent on real-time sensing and control. When introducing cracks and passages in the target formations by hydraulic fracturing, it is beneficial to quickly see the effects of the stimulation actions with high resolution. The use of a DAS system in the production wellbore, or in adjacent wellbores, has the potential to provide high spatial resolution of the fractures created by the stimulation operation and detection of weaker signals, compared to surface geophones. Fracture propagation and rock failures often generate low magnitude impulsive data, referred to as "microseismic," having dominant frequencies in the range of 100-250 Hz. One aspect of DAS that restricts the benefit of its use, however, is the huge amount of data generated, which can be on the order of GB/s. Extracting information on the subterranean fractures from a DAS data stream typically requires significant processing time and therefore cannot provide real-time feedback to the well operator during stimulation operations.

The disclosed technology addresses the foregoing by providing an improved method that analyzes data from a DAS system faster and also more perceptive than conventional methods in identifying microseismic acoustic events. The raw data stream is reduced prior to analysis and the data set further reduced during processing to minimize the amount of data to be processed at each step, which reduces the overall workload by 1000-fold or more. This reduction in the size of the data set inherently decreases the analysis time, thereby presenting results in real-time during operations. The disclosed technology further improves the extraction of information by the use of separately trained CNNs utilizing machine learning (ML) to perform sequential steps in the analysis, thereby improving the results of each step and improving the speed and accuracy of identifying the trace picks of microseismic events. Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Figure 1:
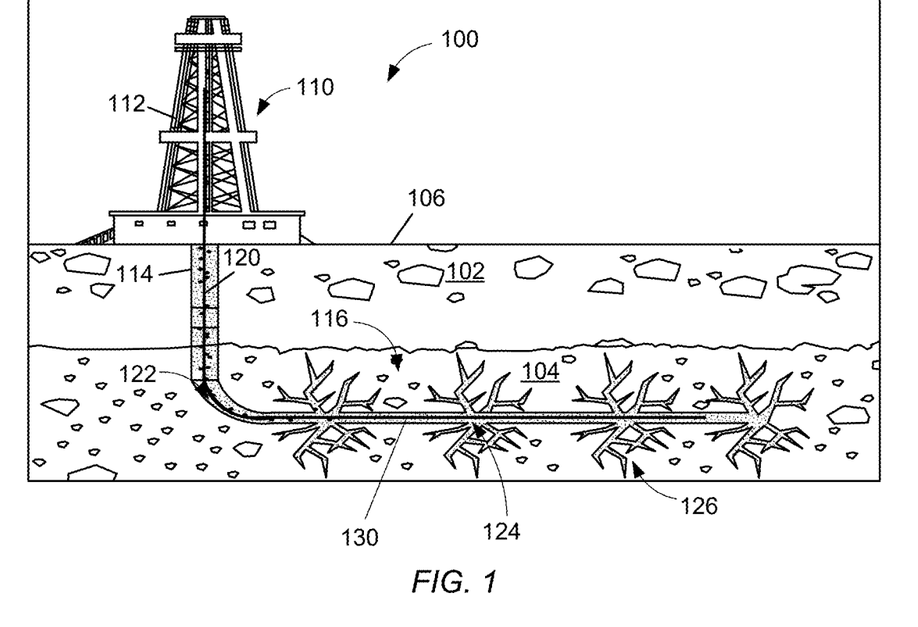
FIG. 1 illustrates a schematic view of an example wellbore operating environment, in accordance with various aspects of the subject technology.

FIG. 1 illustrates a schematic view of an example wellbore operating environment. As depicted in FIG. 1, the operating environment 100 includes a wellbore 114 that penetrates a formation 102 for the purpose of recovering hydrocarbons, storing hydrocarbons, injecting of water or carbon dioxide, or the like in formation 104. In certain embodiments, the purpose of the operating environment 100 is carbon capture & storage (CCS) and includes equipment associated with that purpose (not shown in FIG. 1). In certain embodiments, the purpose of the operating environment 100 is geothermal energy capture and includes equipment associated with that purpose (not shown in FIG. 1).

As depicted in FIG. 1, formation 102, 104 are subterranean formations, although it is noted that formations 102, 104 may be a subsea formation. In certain locations, there are a plurality of underground formations 102, 104. The wellbore 114 may extend substantially vertically away from the Earth's surface 106 over a vertical wellbore portion, or may deviate at any angle from the Earth's surface 106 over a deviated or horizontal wellbore portion 116. In alternative operating environments, portions or substantially all of the wellbore 114 may be vertical, deviated, horizontal, and/or curved. The wellbore 114 may be drilled into the formations 102, 104 using any suitable drilling technique. As shown, a drilling or servicing rig 110 disposed at the surface 106 (which may be the surface of the Earth, a seafloor surface, or a sea surface) comprises a derrick 112 from which a tubular string 120 (e.g., a drill string, a tool string, a segmented tubing string, a jointed tubing string, or any other suitable conveyance, or combinations thereof) is positioned within or partially within the wellbore 114. The tubular string 120 may include two or more concentrically positioned strings of pipe or tubing (e.g., a first work string may be positioned within a second work string). The drilling or servicing rig 110 may be conventional and may include a motor driven winch and other associated equipment for lowering the tubular string into the wellbore 114. Alternatively, a mobile workover rig, a wellbore servicing unit (e.g., coiled tubing units), or the like may be used to lower the work string into the wellbore 114. In such an environment, the tubular string 120 may be utilized in drilling, stimulating, completing, or otherwise servicing the wellbore, or combinations thereof. A drilling or servicing rig 106 may also comprise other equipment, e.g., as disclosed in FIG. 6. In certain types of operations, a fluid 122 is forced down the tubular string 120 and out through perforations 124 to fracture the formations 104 that surround the perforations 124.

While FIG. 1 depicts a stationary drilling rig 106, one of ordinary skill in the art will readily appreciate that mobile workover rigs, wellbore servicing units (such as coiled tubing units), and the like may be employed. In the context of subsea environments and/or subsea formations, one of ordinary skill in the art will appreciate that conventional fixed platforms, vertically moored platforms, spar platforms, semi-submersible platforms, floating production facilities, and sub-sea completion facilities and the like may be employed. It is noted that while the figures or portions thereof may exemplify horizontal or vertical wellbores, the principles of the presently disclosed apparatuses, methods, and systems, may be similarly applicable to horizontal wellbore configurations, conventional vertical wellbore configurations, deviated wellbore configurations, and any combinations thereof. The horizontal, deviated, or vertical nature of any figure is not to be construed as limiting the wellbore to any particular configuration or formation.

In the example depicted in FIG. 1, the operating environment 100 includes at least one fiber optic (FO) cable 130 disposed within a portion of the wellbore 114. As depicted in FIG. 1, the FO cable 130 is disposed within the tubular string 120, although in other embodiments the FO cable 130 is disposed outside of the tubular string 130 and within the wellbore 114. In certain embodiments, the FO cable 130 is at least partially embedded in cement (not shown in FIG. 1) placed in the wellbore 114 outside of the tubular string 130. In certain embodiments, the drilling or servicing rig 106 comprises equipment (not shown in FIG. 1) that interfaces with the FO cable 130 to obtain information about the formation 102.

In certain embodiments, the operating environment 100 includes additional seismic sensing instruments, e.g., one or more geophones and/or one or more accelerometers (not shown in FIG. 1). In certain embodiments, the additional seismic sensing instruments are deployed on the surface 106. In certain embodiments, the additional seismic sensing instruments are deployed in one or both of formations 102, 104 for subsurface sensing or on the surface.

Figure 2:
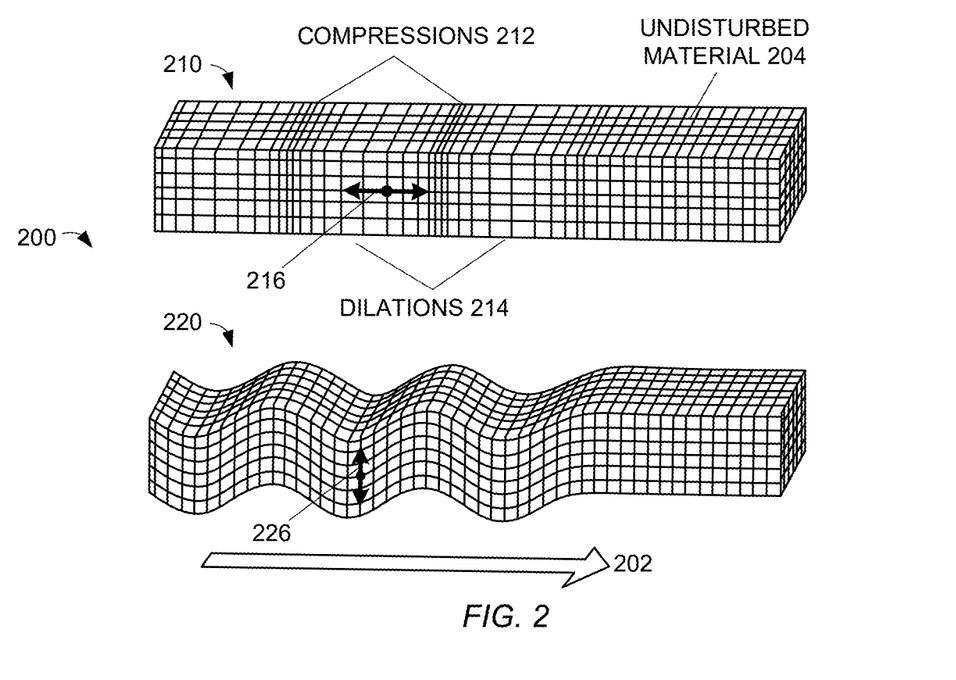
FIG. 2 illustrates the types of seismic waves generated by a fracturing event, in accordance with various aspects of the subject technology.

FIG. 2 illustrates the types of seismic waves 200 generated by a fracturing event, in accordance with various aspects of the subject technology. A physical event that releases energy in a solid material, e.g., development of a crack in rock, induces various types of motion in the surrounding material 204. The first type of motion is axial compression in the form of a compression wave 210, sometimes referred to as a "P-wave," that propagates in direction 202 away from the physical event. The motion of individual particles is forward-and-backward, with respect to the direction 202, as indicated by arrow 216. A compression wave 210 has regions of compressions 212 and regions of dilations 214. The second type of motion is lateral shear in the form of a shear wave 220, sometimes referred to as an "S-wave," that also propagates in direction 202 away from the physical event. The motion of individual particles is side-to-side, with respect to the direction 202, as indicated by arrow 226.

Compression waves and shear waves travel very quickly through geological formations. Typical compression wave velocities in the range of 3.0-6.5 km/s in solid crustal rocks, compared to approximately 0.3 km/s in air. Shear waves are slower than compression wave and have velocities in the range of 1.5-3.8 km/s in solid rocks.

Figure 3:
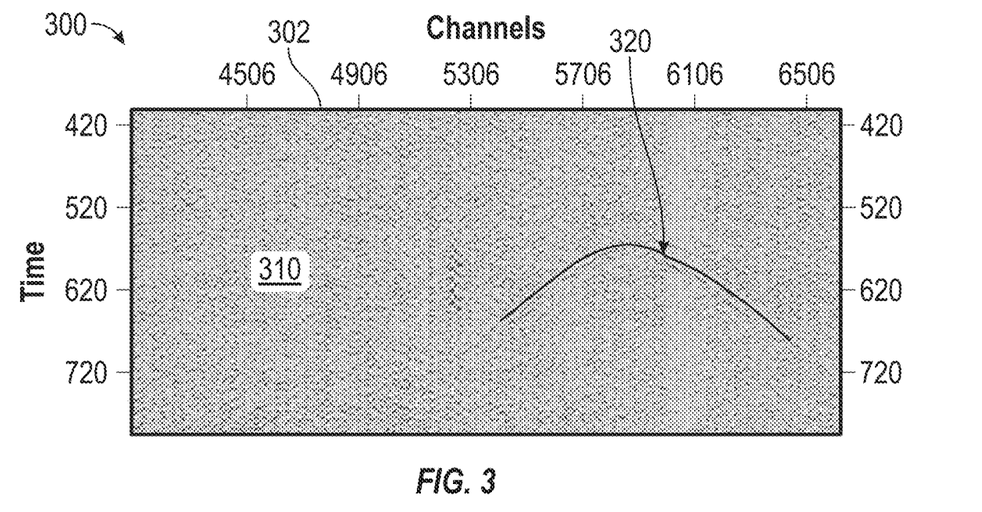
FIG. 3 depicts an example plot of the result of a first phase of signal analysis, in accordance with various aspects of the subject technology.

FIG. 3 depicts an example plot 300 of the result of a first phase of signal analysis, in accordance with various aspects of the subject technology. In DAS systems, a coherent laser pulse is introduced into the top of a FO cable disposed in a wellbore. The optical fiber(s) of the FO cable are stretched and compressed by acoustic waves passing through them, which creates a temporary disturbance of scattering sites within the core of the optical fiber at the point in the FO cable that is stretched or compressed. The scattering sites reflects a portion of the laser light with a phase shift of a magnitude associated with the degree of stretch or compression.

The reflected light contains information from points located along the entire length of the FO cable. The spatial locations are converted to time delays based on the speed of light in an optical fiber. As such, the signal at each point in time of the signal corresponds to a location along the FO cable. The analog optical signal can be sampled and digitized at very high rates, e.g., a 10 km FO cable can be interrogated at 10 kHz.

The FO cable effectively functions as a distributed interferometer with a sensing length, sampling resolution and spatial resolution determined by the digitization rate and other factors. This arrangement of the data is referred to as a "window" of the signal, wherein the window has a start time and a duration. Incremental windows of the received signal have a "stride" that is the change in the start time between sequential windows. This is also referred to as a "sliding window." In certain embodiments, incremental windows overlap. For example, a process may create windows having a 1 second duration with a 0.5 second stride, such that the last half of the first window is repeated as the first half of the second window. This ensures that a microseismic event 320, referred to herein as an "MSE," positioned at the trailing edge of a window, which makes the MSE more difficult to identify, will be in a central portion of the following window, thereby improving the likelihood of detecting the MSE when analyzing all the windows of a signal returned from a common laser pulse.

Plot 300 illustrates an exemplary view of a DAS signal after the received signal has been processed, including downsampling and stacking. The channel numbers 302 are arranged across the top, with each channel presented as a vertical signal. An MSE 320 is visible across a number of adjacent channels overlaid on afield 310 of noise. In this example, the characteristic hyperbolic shape reflects the incremental arrival of a shear wave emanating from a fracture in the surrounding rock. One characteristic of DAS is that shear waves generally produce a stronger effect in the FO cable than compression due to the physics of how the mechanical deformation of the optical fibers is produced by the two types of acoustic waves. In certain embodiments, an MSE may be caused by a compression wave or a shear wave.

One type of signal processing of a DAS signal is to downsample the digitized signal, e.g., reducing a 10 kHz signal to a 1 kHz signal. This can be done using a variety of methods know to those of skill in the art, e.g., averaging a predetermined number of samples. This reduces the magnitude of the signal prior to further analysis.

Another type of signal processing of a DAS signal is to "stack" a predetermined number of adjacent channels, effectively increasing the gauge length, using a variety of methods know to those of skill in the art, e.g., adding the signals of the channels being combined. This also increases the magnitude of the signal prior to further analysis.

Other types of signal processing of a DAS signal include filtering and amplifying the signal. Filtering may include one or more of a high-pass filter, a low-pass filter, a bandpass filter, and a laser-noise filter selected for the input laser pulse as well as other types of filters know to those of skill in the art, e.g., a Kalman filter. Amplification may be used to boost the magnitude of the signal prior to digitization, thereby improving the effective resolution of the digitized signal. In certain embodiments, amplification is implemented by methods know to those of skill in the art, e.g., an automatic gain control filter. In certain embodiments, filtering and/or amplification are performed on the analog signal prior to digitization. In certain embodiments, filtering and/or amplification are performed on the digitized signal.

In certain embodiments, identification of an MSE in a window is performed by a CNN. There may be multiple MSEs within a short time duration from one another, so an object-detection ML model seeks to identify both the onset time of each event and also the apex of the common-source gather hyperbolic moveout. The ML model may be generated using linear regression, lasso, ridge regression, random forest, gradient boosting, and deep learning, among others. In certain embodiments, the ML model is based on a modified U-Net architecture. In certain embodiments, a deep learning model is trained with a dataset of 10,000 samples to recognize DAS MSE characteristics, wherein the seismic energy released when a fracture that fails during hydraulic stimulation crates compression and shear waves that propagate outward. In certain embodiments, the data in the training dataset is divided into different subsets including training data, validation data, and test data. The resulting arrivals observed are hyperbolic in their shape along the gather.

In certain embodiments, the training dataset is created using recorded samples of manually verified actual MSEs collected from actual wellbores as well as noise samples collected from actual wellbores that have been verified to not include MSEs. Subsets of the data are prepared with an output window that contains a particular MSE and multiple input windows containing the same MSE and "contaminated" with various noise samples added at varying ratios from a relative amplitude of 0.1 to 0.9. Multiple subsets are created, with the total number of training windows being on the order of thousands of windows. The CNN develops a "latent" representation of the data, effectively distilling the training information into a small shape of an MSEs most critical elements and then expanding this information back to its original shape. In certain embodiments, the loss function is the mean-squared error posed as a regression problem, minimizing the residual between the "clean" MSE and the noise polluted data. In certain embodiments, the loss function is binary or categorical cross entropy posed as a classification problem, in which the loss is minimized between the known and predicted classification. In certain embodiments, the CNN makes use of skip connections (residual connections), thereby ensuring the model weights of all layers continue to be updated through the model and limit the effects of the 'vanishing gradients' issue.

Figure 4:
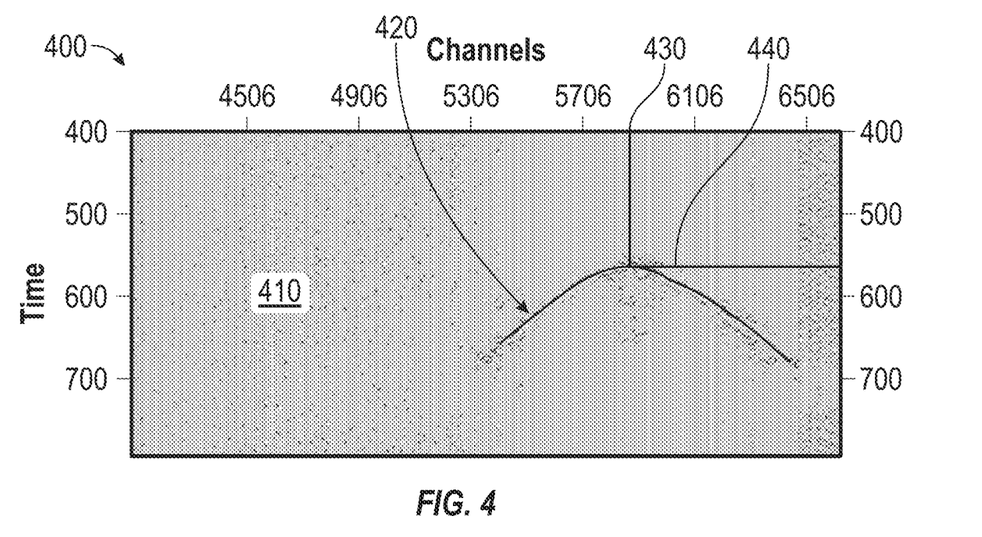
FIG. 4 depicts an example plot of the result of a first phase of signal analysis, in accordance with various aspects of the subject technology.

FIG. 4 depicts a plot 400 of an exemplary result of further processing a window of the received signal, in accordance with various aspects of the subject technology. The onset time 440 and peak channel 430 of the MSE 420 were identified in the prior analysis step. FIG. 4 illustrates the result of further analysis of the window of FIG. 3 by a CNN trained to down-weight the amplitude of noise, whether coherent or incoherent, and boost the amplitude of the desired signal. The target MSEs have a known shape that is determined, in part, by the type of formation in which the wellbore is formed. The noise of a DAS system is generally known from one or both of prior use and analytical evaluation of the effect of various adjacent formations.

The CNN used to process the window of FIG. 3 is trained using a plurality of training windows. In certain embodiments, the set of training windows contains 10,000 or more training windows. By developing a population of microseismic events in common source gather sorting, a user annotates each with the pixels (samples of time and measured depth) that correspond to the compressional and shear arrivals respectively. The ML model applied is like the Deep Learning Signal Processing in that it is a modified UNet tuned for classification purposes, e.g., using a cross entropy cost function. The input to the model is the common source gather microseismic event which has been truncated in time and space due to the predicted event onset time in a previous step and the output is the annotated "mask." The mask is a set of samples in time and measured depth with the same shape as the input microseismic data wherein the samples are integer valued. For example, the background noise will be annotated as class 0, the compressional arrival will be class 1, and shear horizontal arrival as class 2. Thus, the model seeks to build a latent (compressed) representation that captures the statistical nature of each of these annotated pixels (time and measured depth). The CNN model will make predictions for each input class (noise, compressional, shear) and the maximum prediction for each pixel will be utilized. The predicted class 'masks' are often blobby in time/space with the event energy having significant coda (trapped mode energy within the source/DAS fiber formation(s)). In certain embodiments, the first sample of each blob is selected to represent the first arrival of the microseismic event energy.

In certain embodiments, the first arrival picks can be refined utilizing cross-correlation between adjacent channels such that the onset times of each recording channel along the FO cable are consistent.

Certain windows of the training set have only examples of MSEs while other windows contain example MSEs and noise. In certain embodiments, the sample MSEs are collected from actual DAS systems in actual wellbores are used. In certain embodiments, the noise samples are collected from actual DAS systems in actual wellbores. Actual MSEs and noise are considered more representative of what will be processed by the CNN, compared to synthetic MSEs and synthetic noise.

In certain embodiments, a training set is composed of subsets of training windows. Each subset has an output training window having an example MSE and a plurality of input training windows. Each input training window has the example MSE of the output training window that has been "contaminated" with one of a plurality of noise samples. In certain embodiments, the SNR of the common MSE and the particular noise sample will vary across the input training windows of a subset. The training of the CNN includes providing each subset of training windows to the CNN, which then seeks to build a latent (compressed) representation that minimizes a cost function in extracting the example MSE from the input windows.

In certain embodiments, the windows of FIG. 3 have been segregated into multiple groups, for example a first group having exclusively windows with a high SNR and a second group having exclusively windows with a low SNR. In certain embodiments, the CNN used to the process the first group will be trained exclusively with high SNR training windows while the same CNN will be trained exclusively with low SNR training windows to be used to process the second group.

Determination of the physical location of the fracture associated with the MSE 420 utilizes the first arrival picks as well the event apex position defined by the event onset detection model. The apex of the microseismic event corresponds to a specific recording channel along the FO cable, which has a known position in XYZ space around the FO cable. By setting the initial location to this XYZ point, it is known that the true microseismic event location lies on a plane (X-Z plane) which is orthogonal to the wellbore trajectory in Y, assuming the well is locally drilled in a relatively straight line. Using the velocities of the formations above and below the wells being hydraulically fractured, a set of MSE arrival times can be developed for each voxel in 3D space, e.g., a 15 m×15 m×15 m 3D grid. The MSE location scheme uses least-squares travel-time minimization between each of these voxels in the X-Z plane at the apex recording channel position and a global minimum residual for the optimal spatial location is obtained.

Figure 5:
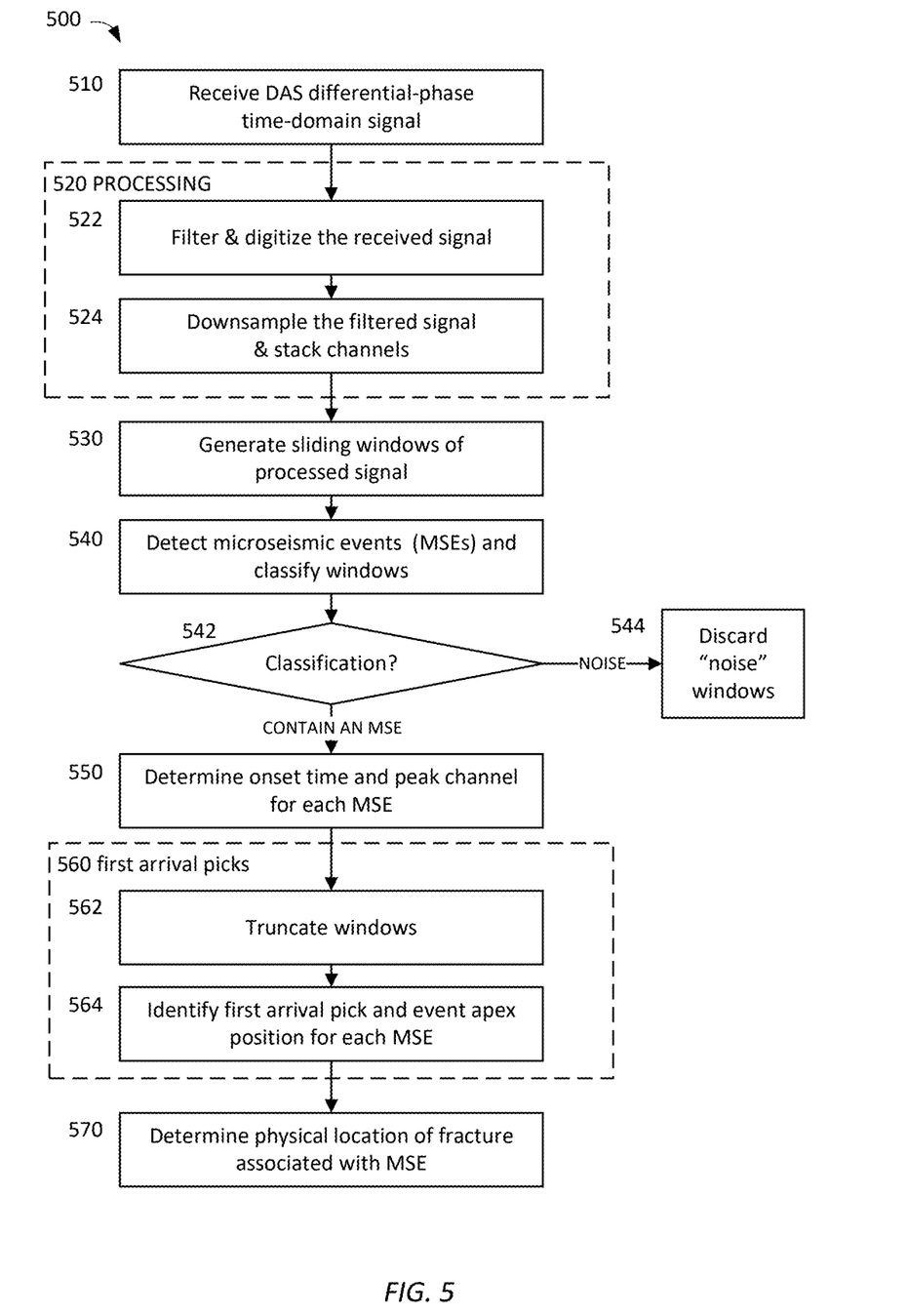
FIG. 5 is an exemplary workflow, in accordance with various aspects of the subject technology.

FIG. 5 is an exemplary workflow 500, in accordance with various aspects of the subject technology. The workflow starts in step 510 with the receipt of a signal from an optical detector (see FIG. 6) connected to a FO cable disposed within a wellbore (as shown in FIG. 1). In this example, the signal is an analog electronic signal having an approximate total duration equal to time that a laser pulse takes to make the round-trip from the laser to the bottom end of the FO cable and return to the optical detector. The signal contains portions that are phase-shifted, also referred to herein as a "differential phase," from the frequency of the input laser pulse.

In step 520, the received signal is processed before any type of computational analysis or data processing is performed. In certain embodiments, this includes a step 522 that comprises one of more of analog filtering, digital filtering, amplification or reduction, and other signal processing known to those of skill in the art. Step 520 includes digitizing the analog signal by sampling at a predetermined frequency, e.g., 15 kHz, wherein each sample is associated with a distance along the FO cable. The signal will have a first magnitude based in part on the total duration of the signal, the sampling frequency, and the resolution of the analog-to-digital conversion. In certain embodiments, the processing step 520 includes step 524 wherein the digitized signal is downsampled, e.g., a predetermined number of adjacent digital samples are combined to boost the signal, with the effect of reducing the magnitude of the processed signal.

In certain embodiments, step 524 also segments the signal into "channels" then stacks a predetermined number of adjacent channels, which also reduces the magnitude of the processed signal. Performing one or both of the actions of step 524 prior to processing reduces the computational time of the remaining steps in the workflow 500 by a factor of up to 100×.

Step 530 now segments the stacked signal into "windows" of a predetermined duration, e.g., the window of FIG. 3. In certain embodiments, windows are created at incremental time, referred to as a "stride" of the creation process, such that windows overlap.

Step 540 applies ML to processing the received signal in order to increase the signal-to-noise ratio (SNR) of an MSE if present in each window. In certain embodiments, the ML model has a modified U-Net architecture. The ML model may be generated using linear regression, lasso, ridge regression, random forest, gradient boosting, and deep learning, among others. In certain embodiments, the ML model is trained using e.g., 10,000 data windows that have been manually verified to contain a MSE and contaminated with a variety of field noises. In certain embodiments, the training is posed as a regression problem structured to minimize the MSE loss between clean and contaminated event so as to increase the SNR of microseismic event compared to the field noise.

The windows are provided as input to a CNN in step 540 to detect whether each window includes an MSE. In certain embodiments, the ML model has a ResNet50 architecture. In certain embodiments, the ML model is trained using a plurality of data windows, e.g., 10,000 data windows, that have been manually verified to contain a MSE and contaminated with a variety of coherent/incoherent noises. In certain embodiments, the training is posed as a classification problem structured to minimize cross-entropy loss.

The windows are classified as "having an MSE" if an MSE is detected or classified as "noise" if no MSE is detected. In certain embodiments, the "having an MSE" group is subdivided into a "high SNR" and a "low SNR" group. The noise group is routed by step 542 to step 544 and discarded, thereby further reducing the magnitude of the data set being analyzed and further reducing the computational time.

Step 550 submits the windows having an MSE to a second CNN trained to increase the SNR of the MSE compared to the noise in the window then identify an onset time and peak channel in the window.

Step 560 receives the window and information from step 550 and identifies a first arrival time and an event apex position based, in part, on the onset time and peak channel. In certain embodiments, the ML model for onset detection has an EfficientDet architecture. In certain embodiments, the ML model is trained using a plurality of data windows, e.g., 10,000 data windows, that have bounding boxes annotated around the center of the hyperbolic moveout peak along the channel axis (measured depth) and in time at the onset of arrival. In certain embodiments, the training is posed as a classification and regression problem, structured to minimize cross-entropy and mean squared error respectively.

In certain embodiments, the ML model for first arrival picking has a modified U-Net architecture. In certain embodiments, the ML model is trained using a plurality of data windows, e.g., 10,000 data windows, that have user-annotated 'masks' with pixel-by-pixel classifications as either noise, P-wave, or S-wave arrivals. In certain embodiments, the training is posed as a classification problem of each pixel, structured to minimize the cross-entropy loss.

In certain embodiments, step 560 includes a step 562 that truncates the window by either removing in their entirety channels that do not contain a part of the MSE or by removing from all channels time portions that do not contain a part of the MSE. This again reduces the magnitude of the window data to be processed and speeds up the step 564, which identifies the first arrival pick and the event apex position.

Step 570 concludes the workflow 500 by determining the physical position of the fracture associated with the MSE. In certain embodiments, this physical position is provided to the well operator or to another program that stores and presents this information.

Steps 500-570 are performed on each window determined in step 540 to contain an MSE.

Figure 6:
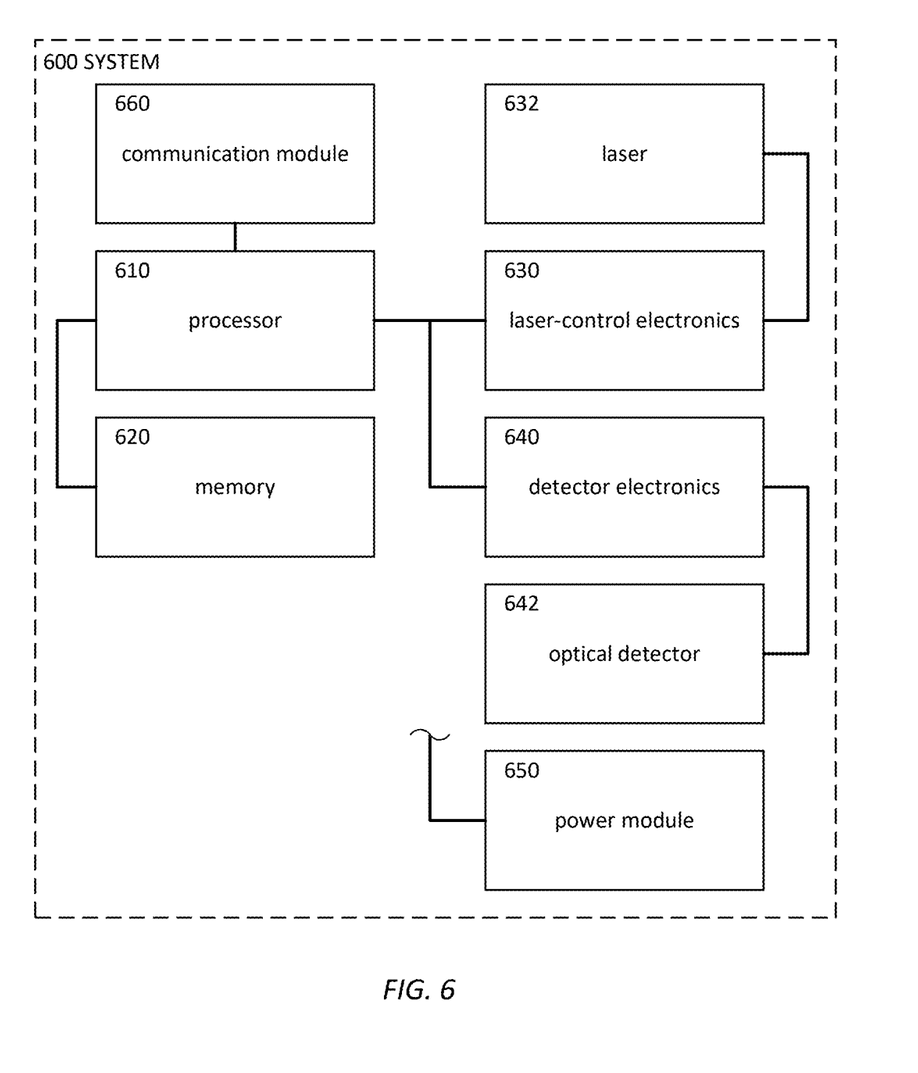
FIG. 6 is an exemplary block diagram of an exemplary system for operation of a DAS system, in accordance with various aspects of the subject technology.

FIG. 6 is an exemplary block diagram of an exemplary system 600 for operation of a DAS system, in accordance with various aspects of the subject technology. The system 600 includes a processor 610 coupled to a memory 620, laser control electronics 630, and detector electronics 640. The laser control electronics are connected to and control the laser 632. The detector electronics 640 are connected to and control the optical detector 642. In certain embodiments, the processor 610 is coupled to a communication module 660, which may include wired and wireless means of exchanging information with external systems, e.g., a network, a server, or portable devices including laptop computers and smart phones. The system 600 includes a power module 650 connected to every other component within the system (this connection omitted in FIG. 6 for clarity).

In certain embodiments, one or more components of the system 600 are located on the drilling rig 110. In certain embodiments, one of more components are located remote from the drilling rig 110. In certain embodiments, a component is implemented as multiple components in different locations and coupled through the communication module 660.

In summary, the procedures an expert analyst would perform in processing DAS microseismic data can not only be automated but optimized using a cascading workflow of trained ML models. Applying a cutting-edge signal processing technique (deep learning signal processing) to a sliding window of continuous record data, the MSE energy can be boosted while reducing the coherent/incoherent background noise. Following this signal processing routine, a CNN classifier model will determine whether a microseismic event exists. This determines whether the frame of data will be passed further in the processing flow. Once a sliding window of data is confirmed to have an MSE, the CNN uses an event onset object detection model will scan time/measured depth to identify both the onset of each unique event as well as the FO cable channel corresponding to the apex energy. Each unique event will then be passed through a first arrival picking ML model, which seeks to identify the onset of energy for each waveform phase of interest (compressional and shear horizontal/vertical waves). The first arrival picks will be used to find the global minimum position in space between the modelled travel times and the actual travel times, with a spatial search constraint in place due to the known apex position (midpoint channel of the even onset detection prediction). This DAS microseismic processing workflow is optimized to produce rapid results (GPU accelerated) and apply the minimal required physics and spatial/temporal transformations to reach the goal of obtaining the true source location.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a non-volatile computer-readable memory, or other data storage medium, comprising program code including instructions that, when executed, performs one or more of the method, algorithms, and/or operations described above. The computer-readable data storage medium may form part of a computer program product, which may include packaging materials.

A computer-readable memory, as used herein, includes any type of storage media, e.g., a random access memory (RAM), a synchronous dynamic random access memory (SDRAM), a read-only memory (ROM), a non-volatile random access memory (NVRAM), an electrically erasable programmable read-only memory (EEPROM), a FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B. Statements of the Disclosure Include:

(A1) A method of operating a seismic system is disclosed, the method comprising steps of: receiving a time-domain signal from a seismic tool disposed in a wellbore, the signal comprising a plurality of channels respectively associated with a plurality of distances along the wellbore; processing the received signal by downsampling the received signal and stacking the channels into groups of a predetermined number of channels, thereby providing a first reduction in a magnitude of the received signal to be further analyzed; generating a plurality of signal windows of the processed signal, each signal window having a first time duration and a stride of a second time duration that is less than the first time duration; analyzing each of the plurality of signal windows to either identify an MSE in the signal window or determine that the signal window contains only noise, then discarding all signal windows that contain only noise, thereby providing a second reduction in the magnitude of the received signal to be further analyzed; determining an onset time and a peak channel of the identified MSE; identifying a first arrival pick and an event apex position based in part on the determined onset time and the determined peak channel; and determining a physical location of a fracture associated with the MSE based in part on the identified first arrival pick and the identified event apex position.

(A2) The method of A1, wherein: processing the received signal further comprises application of one or more of a high-pass filter, a low-pass filter, a bandpass filter, a laser-noise filter, and an automatic gain control filter; and processing the received signal occurs before analyzing each of the plurality of signal windows.

(A3) The method of A1, wherein: analyzing each of the plurality of signal windows is performed by a first convolutional neural network (CNN) trained with a first set of training windows comprising a plurality of first subsets of training windows; and each first subset comprises an output training window having only an example MSE and a plurality of input training windows each having the example MSE and a respective selection from a plurality of noise samples.

(A4) The method of A3, wherein: analyzing each of the plurality of signal windows comprises assigning each signal window identified as having an MSE into one of a high SNR group and a low SNR group; identifying the MSE in the high SNR group is performed with the first CNN trained with input training windows having a first SNR; and identifying the MSE in the low SNR group is performed with the first CNN trained with input training windows having a second SNR that is lower than the first SNR.

(A5) The method of A1, wherein: determining the onset time comprises increasing the signal-to-noise ratio (SNR) in each of the plurality of signal windows using a second convolutional neural network (CNN) trained with a second set of training windows comprising a plurality of second subsets of training windows; and each second subset comprises an output training window having an example MSE and a plurality of input training windows each having the example MSE and a respective selection from a plurality of noise samples.

(A6) The method of A1, wherein: identifying the first arrival pick and the event apex position comprises truncating the signal window to remove a portion of the signal window that does not contain the identified MSE, thereby providing a third reduction in the magnitude of the received signal to be further analyzed; identifying the first arrival pick is performed by a third convolutional neural network (CNN) trained with a third set of training windows comprising a plurality of third subsets of training windows; each third subset comprises an output training window having an example arrival pick and a plurality of input training windows each having a respective selection from a plurality of MSEs associated with the example arrival pick; and the truncation of the signal window is performed before the third CNN identifies the first arrival pick.

(A7) The method of A6, wherein truncating the signal window comprises removing at least one of a portion of the channels and a time portion of all the channels.

(A8) The method of A1, wherein the seismic sensor comprises a fiber optic (FO) cable disposed along a portion of the wellbore; the received signal comprises differential-phase information; and the seismic sensing system comprises a distributed acoustic sensing (DAS) system.

(B1) A non-transitory computer-readable memory is disclosed that comprises instructions for operating a seismic system that, when loaded into a processor and executed, cause the process to execute the steps of: receiving a time-domain signal from a seismic tool disposed in a wellbore, the signal comprising a plurality of channels respectively associated with a plurality of distances along the wellbore; processing the received signal by downsampling the received signal and stacking the channels into groups of a predetermined number of channels, thereby providing a first reduction in a magnitude of the received signal to be further analyzed; generating a plurality of signal windows of the processed signal, each signal window having a first time duration and a stride of a second time duration that is less than the first time duration; analyzing each of the plurality of signal windows to either identify an MSE in the signal window or determine that the signal window contains only noise, then discarding all signal windows that contain only noise, thereby providing a second reduction in the magnitude of the received signal to be further analyzed; determining an onset time and a peak channel of the identified MSE; identifying a first arrival pick and an event apex position based in part on the determined onset time and the determined peak channel; and determining a physical location of a fracture associated with the MSE based in part on the identified first arrival pick and the identified event apex position.

(C1) A system for operating a DAS system is disclosed, the system comprising a processor and a non-transitory computer-readable memory coupled to the processor. The memory comprises instructions for operating a seismic sensing system that, when loaded into a processor and executed, cause the process to execute the steps of: receiving a time-domain signal from a seismic tool disposed in a wellbore, the signal comprising a plurality of channels respectively associated with a plurality of distances along the wellbore; processing the received signal by downsampling the received signal and stacking the channels into groups of a predetermined number of channels, thereby providing a first reduction in a magnitude of the received signal to be further analyzed; generating a plurality of signal windows of the processed signal, each signal window having a first time duration and a stride of a second time duration that is less than the first time duration; analyzing each of the plurality of signal windows to either identify a microseismic event (MSE) in the signal window or determine that the signal window contains only noise, then discarding all signal windows that contain only noise, thereby providing a second reduction in the magnitude of the received signal to be further analyzed; determining an onset time and a peak channel of the identified MSE; identifying a first arrival pick and an event apex position based in part on the determined onset time and the determined peak channel; and determining a physical location of a fracture associated with the MSE based in part on the identified first arrival pick and the identified event apex position.

What is claimed is:

1. A method of operating a seismic sensing system, comprising:
    receiving a time-domain signal from a seismic tool disposed in a wellbore, the signal comprising a plurality of channels respectively associated with a plurality of distances along the wellbore;
    processing the received signal by downsampling the received signal and stacking the channels into groups of a predetermined number of channels, thereby providing a first reduction in a magnitude of the received signal to be further analyzed;
    generating a plurality of signal windows of the processed signal, each signal window having a first time duration and a stride of a second time duration that is less than the first time duration;
    analyzing each of the plurality of signal windows to either identify a microseismic event (MSE) in the signal window or determine that the signal window contains only noise, then discarding all signal windows that contain only noise, thereby providing a second reduction in the magnitude of the received signal to be further analyzed;
    determining an onset time and a peak channel of the identified MSE;
    identifying a first arrival pick and an event apex position based in part on the determined onset time and the determined peak channel; and
    determining a physical location of a fracture associated with the MSE based in part on the identified first arrival pick and the identified event apex position.

2. The method of claim 1, wherein:
processing the received signal further comprises application of one or more of a high-pass filter, a low-pass filter, a bandpass filter, a laser-noise filter, and an automatic gain control filter; and
processing the received signal occurs before analyzing each of the plurality of signal windows.

3. The method of claim 1, wherein:
analyzing each of the plurality of signal windows is performed by a first convolutional neural network (CNN) trained with a first set of training windows comprising a plurality of first subsets of training windows; and
each first subset comprises an output training window having only an example MSE and a plurality of input training windows each having the example MSE and a respective selection from a plurality of first noise samples.

4. The method of claim 3, wherein:
analyzing each of the plurality of signal windows comprises assigning each signal window identified as having an MSE into one of a high signal-to-noise (SNR) group and a low SNR group;
identifying the MSE in the high SNR group is performed with the first CNN trained with input training windows having a first SNR; and
identifying the MSE in the low SNR group is performed with the first CNN trained with input training windows having a second SNR that is lower than the first SNR.

5. The method of claim 1, wherein:
determining the onset time comprises increasing the signal-to-noise ratio (SNR) in each of the plurality of signal windows using a second convolutional neural network (CNN) trained with a second set of training windows comprising a plurality of second subsets of training windows; and
each second subset comprises an output training window having an example MSE and a plurality of input training windows each having the example MSE and a respective selection from a plurality of second noise samples.

6. The method of claim 1, wherein:
identifying the first arrival pick and the event apex position comprises truncating the signal window to remove a portion of the signal window that does not contain the identified MSE, thereby providing a third reduction in the magnitude of the received signal to be further analyzed;
identifying the first arrival pick is performed by a third convolutional neural network (CNN) trained with a third set of training windows comprising a plurality of third subsets of training windows;
each third subset comprises an output training window having an example arrival pick and a plurality of input training windows each having a respective selection from a plurality of MSEs associated with the example arrival pick; and
the truncation of the signal window is performed before the third CNN identifies the first arrival pick.

7. The method of claim 6, wherein truncating the signal window comprises removing at least one of a portion of the channels and a time portion of all the channels.

8. A non-transitory computer-readable memory comprising instructions for operating a seismic sensing system that, when loaded into a processor and executed, cause the process to execute the steps of:
receiving a time-domain signal from a seismic tool disposed in a wellbore, the signal comprising a plurality of channels respectively associated with a plurality of distances along the wellbore;
processing the received signal by downsampling the received signal and stacking the channels into groups of a predetermined number of channels, thereby providing a first reduction in a magnitude of the received signal to be further analyzed;
generating a plurality of signal windows of the processed signal, each signal window having a first time duration and a stride of a second time duration that is less than the first time duration;
analyzing each of the plurality of signal windows to either identify a microseismic event (MSE) in the signal window or determine that the signal window contains only noise, then discarding all signal windows that contain only noise, thereby providing a second reduction in the magnitude of the received signal to be further analyzed;
determining an onset time and a peak channel of the identified MSE;
identifying a first arrival pick and an event apex position based in part on the determined onset time and the determined peak channel; and
determining a physical location of a fracture associated with the MSE based in part on the identified first arrival pick and the identified event apex position.

9. The memory of claim 8, wherein:
processing the received signal further comprises application of one or more of a high-pass filter, a low-pass filter, a bandpass filter, a laser-noise filter, and an automatic gain control filter; and
processing the received signal occurs before analyzing each of the plurality of signal windows.

10. The memory of claim 8, wherein:
analyzing each of the plurality of signal windows is performed by a first convolutional neural network (CNN) trained with a first set of training windows comprising a plurality of first subsets of training windows; and
each first subset comprises an output training window having only an example MSE and a plurality of input training windows each having the example MSE and a respective selection from a plurality of first noise samples.

11. The memory of claim 10, wherein:
analyzing each of the plurality of signal windows comprises assigning each signal window identified as having an MSE into one of a high signal-to-noise (SNR) group and a low SNR group;
identifying the MSE in the high SNR group is performed with the first CNN trained with input training windows having a first SNR; and
identifying the MSE in the low SNR group is performed with the first CNN trained with input training windows having a second SNR that is lower than the first SNR.

12. The memory of claim 8, wherein:
determining the onset time comprises increasing the SNR in each of the plurality of signal windows using a second convolutional neural network (CNN) trained with a second set of training windows comprising a plurality of second subsets of training windows; and
each second subset comprises an output training window having an example MSE and a plurality of input training windows each having the example MSE and a respective selection from a plurality of second noise samples.

13. The memory of claim 8, wherein:

identifying the first arrival pick and the event apex position comprises truncating the signal window to remove a portion of the signal window that does not contain the identified MSE, thereby providing a third reduction in the magnitude of the received signal to be further analyzed;

identifying the first arrival pick is performed by a third convolutional neural network (CNN) trained with a third set of training windows comprising a plurality of third subsets of training windows;

each third subset comprises an output training window having an example arrival pick and a plurality of input training windows each having a respective selection from a plurality of MSEs associated with the example arrival pick; and the truncation of the signal window is performed before the third CNN identifies the first arrival pick.

14. The memory of claim 13, wherein truncating the signal window comprises removing at least one of a portion of the channels and a time portion of all the channels.

15. A system for operating a seismic sensing system, comprising:

a processor; and a non-transitory computer-readable memory coupled to the processor and comprising instructions for operating a seismic sensing system that, when loaded into a processor and executed, cause the process to execute the steps of:

receiving a time-domain signal from a seismic tool disposed in a wellbore, the signal comprising a plurality of channels respectively associated with a plurality of distances along the wellbore;

processing the received signal by downsampling the received signal and stacking the channels into groups of a predetermined number of channels, thereby providing a first reduction in a magnitude of the received signal to be further analyzed;

generating a plurality of signal windows of the processed signal, each signal window having a first time duration and a stride of a second time duration that is less than the first time duration;

analyzing each of the plurality of signal windows to either identify a microseismic event (MSE) in the signal window or determine that the signal window contains only noise, then discarding all signal windows that contain only noise, thereby providing a second reduction in the magnitude of the received signal to be further analyzed;

determining an onset time and a peak channel of the identified MSE;

identifying a first arrival pick and an event apex position based in part on the determined onset time and the determined peak channel; and determining a physical location of a fracture associated with the MSE based in part on the identified first arrival pick and the identified event apex position.

16. The system of claim 15, wherein:

processing the received signal further comprises application of one or more of a high-pass filter, a low-pass filter, a bandpass filter, a laser-noise filter, and an automatic gain control filter; and processing the received signal occurs before analyzing each of the plurality of signal windows.

17. The system of claim 16, wherein:

analyzing each of the plurality of signal windows is performed by a first convolutional neural network (CNN) trained with a first set of training windows comprising a plurality of first subsets of training windows; and each first subset comprises an output training window having only an example MSE and a plurality of input training windows each having the example MSE and a respective selection from a plurality of first noise samples.

18. The system of claim 15, wherein:

analyzing each of the plurality of signal windows comprises assigning each signal window identified as having an MSE into one of a high signal-to-noise (SNR) group and a low SNR group;

identifying the MSE in the high SNR group is performed with the first CNN trained with input training windows having a first SNR; and identifying the MSE in the low SNR group is performed with the first CNN trained with input training windows having a second SNR that is lower than the first SNR.

19. The system of claim 15, wherein:

determining the onset time comprises increasing the SNR in each of the plurality of signal windows using a second convolutional neural network (CNN) trained with a second set of training windows comprising a plurality of second subsets of training windows; and each second subset comprises an output training window having an example MSE and a plurality of input training windows each having the example MSE and a respective selection from a plurality of second noise samples.

20. The system of claim 15, wherein:

identifying the first arrival pick and the event apex position comprises truncating the signal window to remove a portion of the signal window that does not contain the identified MSE, thereby providing a third reduction in the magnitude of the received signal to be further analyzed;

identifying the first arrival pick is performed by a third convolutional neural network (CNN) trained with a third set of training windows comprising a plurality of third subsets of training windows;

each third subset comprises an output training window having an example arrival pick and a plurality of input training windows each having a respective selection from a plurality of MSEs associated with the example arrival pick; and the truncation of the signal window is performed before the third CNN identifies the first arrival pick.

* * * * *